(12) United States Patent
Vogel (10) Patent No.: US 8,842,404 B2
(45) Date of Patent: Sep. 23, 2014

(54) SHORT CIRCUIT PROTECTION DEVICE AND SWITCHGEAR ASSEMBLY HAVING SUCH PROTECTION DEVICES

(75) Inventor: Reinhard Vogel, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 369 days.

(21) Appl. No.: 13/148,332

(22) PCT Filed: Feb. 4, 2010

(86) PCT No.: PCT/EP2010/051339
§ 371 (c)(1),
(2), (4) Date: Aug. 8, 2011

(87) PCT Pub. No.: WO2010/089338
PCT Pub. Date: Aug. 12, 2010

(65) Prior Publication Data
US 2011/0317321 A1    Dec. 29, 2011

(30) Foreign Application Priority Data
Feb. 6, 2009 (DE) .......................... 10 2009 007 969

(51) Int. Cl.
| | |
|---|---|
| H02H 3/08 | (2006.01) |
| H02H 9/02 | (2006.01) |
| H02H 9/08 | (2006.01) |
| H02H 3/02 | (2006.01) |
| H02H 3/087 | (2006.01) |
| B63G 8/08 | (2006.01) |

(52) U.S. Cl.
CPC ............... *H02H 3/025* (2013.01); *H02H 3/087* (2013.01); *B63G 8/08* (2013.01)
USPC ........................................ 361/93.1; 361/93.9

(58) Field of Classification Search
USPC .......................................... 361/93.1, 93.9, 94
See application file for complete search history.

(56) References Cited

U.S. PATENT DOCUMENTS

| | | | |
|---|---|---|---|
| 4,695,741 A | | 9/1987 | Takeda |
| 5,305,174 A | * | 4/1994 | Morita et al. .................... 361/63 |
| 5,726,849 A | * | 3/1998 | Nakamura .................... 361/93.5 |
| 5,864,458 A | * | 1/1999 | Duffy et al. .................. 361/93.9 |
| 7,800,870 B2 | * | 9/2010 | Matsumoto et al. ............. 361/18 |

(Continued)

FOREIGN PATENT DOCUMENTS

| | | |
|---|---|---|
| DE | 10 2007 053 229 A1 | 5/2008 |
| DE | 102007053229 A1 | 5/2008 |

(Continued)

OTHER PUBLICATIONS

International Search Report of PCT/EP2010/051339, Dated August 6, 2010.

*Primary Examiner* — Rexford N Barnie
*Assistant Examiner* — Christopher Clark
(74) *Attorney, Agent, or Firm* — Laurence A. Greenberg; Werner H. Stemer; Ralph E. Locher (57) ABSTRACT

A short-circuit protection device for limiting, preferably also deactivating, short-circuit currents in high energy direct current networks, in particular short-circuit currents of battery systems in submarine direct current networks. The device includes an electrical resistor, in particular an ohmic resistor, to conduct and limit the short-circuit current in the case of a short-circuit, a first switch connected in parallel with the resistor for bridging the resistor when the network is free of short-circuit, a monitoring and control arrangement for monitoring the current by the switch and for opening the switch if the current through the switch exceeds a specified threshold value.

17 Claims, 5 Drawing Sheets

(56) References Cited

U.S. PATENT DOCUMENTS

| | | | |
|---|---|---|---|
| 7,974,059 B2 * | 7/2011 | Chishima | 361/93.7 |
| 2007/0091528 A1 * | 4/2007 | Yamashita | 361/93.1 |
| 2008/0304198 A1 * | 12/2008 | Chishima | 361/93.7 |
| 2011/0045323 A1 * | 2/2011 | Ooi et al. | 429/50 |

FOREIGN PATENT DOCUMENTS

| | | |
|---|---|---|
| EP | 0 161 628 A2 | 11/1985 |
| EP | 1 022 753 A1 | 7/2000 |
| EP | 1 526 625 A2 | 4/2005 |
| EP | 1641066 A2 | 3/2006 |
| GB | 2 284 100 A | 5/1995 |
| JP | 7131927 A | 5/1995 |
| JP | 2003189480 A | 7/2003 |
| KR | 1020080032920 A | 4/2008 |
| WO | 2006/089904 A1 | 8/2006 |
| WO | 2008055493 A1 | 5/2008 |
| WO | 2010/003835 A2 | 1/2010 |

* cited by examiner

SHORT CIRCUIT PROTECTION DEVICE AND SWITCHGEAR ASSEMBLY HAVING SUCH PROTECTION DEVICES

BACKGROUND OF THE INVENTION

Field of the Invention

The invention relates to a short circuit protection device for limiting, preferably also disconnecting, short-circuit currents in high-energy DC power supply systems, in particular short-circuit currents of battery systems in submarine DC power supply systems. The invention furthermore relates to a switchgear assembly having a plurality of such protection devices.

Batteries or rechargeable batteries are preferably used for storing energy in DC power supply systems. In order to simplify the terminology used, only the term "batteries" will be used below for both types of energy stores. Of particular advantage here are those batteries which have a low internal resistance, a low level of self-discharge and a high energy density. From the present prior art, primarily batteries based on lithium meet these requirements, with the result that they are also used increasingly in high-power DC power supply systems. A very typical field of use in this case is DC island networks, as are used in vehicles (for example submarines).

Thus, for example, EP 1 641 066 A2 and WO 2008/055493 A1 have disclosed a submarine DC power supply system with a battery based on lithium. In this case, the battery comprises a plurality of battery modules, which are connected in parallel and which are connected to the DC power supply system via connecting conductors, the battery modules each comprising a string or a plurality of strings, connected in parallel, of high-power battery cells connected in series, and the or each of the strings having the system voltage of the DC power supply system. A switchgear assembly in this case serves to switch the operating currents and to limit the short-circuit currents.

The low internal resistance of lithium batteries which is advantageous in the interest of high efficiency in terms of energy storage does have the disadvantage, however, in the event of a short circuit in the DC power supply system that very high short-circuit currents occur. These short-circuit currents have a magnitude which is a multiple of that which was previously known for other batteries, for example lead batteries. In the case of a submarine DC power supply system, the prospective short-circuit currents can be, for example, 20 kA for a battery string and up to 500 kA per battery.

In conjunction with the very high short-circuit current, there is a very rapid increase in this short-circuit current. Thus, the time constant of the uninfluenced short-circuit current is only a few milliseconds, for example.

The disconnection of such a short-circuit current is therefore problematic in particular when electromagnetically actuated circuit breakers with overcurrent identification are used for monitoring and disconnecting the short-circuit current, said circuit breakers having an unavoidable response and tripping time. Since the resultant overcurrent identification and disconnection time of such circuit breakers is equal to or greater than the time constant of the uninfluenced short-circuit current of the batteries, there is already such a high current flowing at the disconnection time that the circuit breaker is overloaded by the then very high disconnection energy $W \sim I^2$. This may result in serious damage to the circuit breaker itself and/or to the components which the circuit breaker is intended to protect.

As an alternative or in addition to circuit breakers, in some cases fusible links can be used which need to be replaced by new fuses once the short-circuit current has been disconnected. In many cases, such a replacement of fuses after short-circuits is not desirable or else not possible in a short period of time, however. A typical case in this regard is a DC island power supply system, for example on vehicles, such as submarines, for example.

If the short-circuit current is disconnected by a suitable switch virtually without any delay, there is the problem that there is insufficient time remaining to trigger electromagnetically actuated circuit breakers connected downstream. Therefore, only restricted selectivity in the DC power supply system can be achieved.

BRIEF SUMMARY OF THE INVENTION

It is therefore the object of the present invention to provide a protection device and a switchgear assembly having such protection devices, with which it is possible to safely control the short-circuit current occurring in the event of a short circuit in a high-energy DC power supply system, with it being possible to avoid the above-described problems.

This object is achieved by a short circuit protection device and various advantageous configurations of the protection device as claimed. A switchgear assembly with such protection devices and various advantageous configurations of the switchgear assembly are the subject matter of the claims.

A short circuit protection device according to the invention for limiting, preferably also disconnecting, short-circuit currents in high-energy DC power supply systems, in particular short-circuit currents of battery systems in submarine DC power supply systems, comprises an electrical resistance, in particular an ohmic resistance, for guiding and limiting the short-circuit current in the event of a short circuit, a first switch, which is connected in parallel with the resistance, for bypassing the resistance when there is no short circuit in the power supply system, and a monitoring and control device for monitoring the current through the switch and for opening the switch when the current through the switch exceeds a predetermined limit value.

When there are no short circuits in the power supply system, the current therefore bypasses the electrical resistance. As soon as the monitoring and control device detects a short-circuit current, however, it opens the switch and the current is guided via the resistance. With the aid of the resistance, the short-circuit current can be limited in terms of its level, its temporal effectiveness and possibly also its rise (gradient), with the result that protection elements connected downstream, such as electromagnetically acting circuit breakers, for example, can trip safely. Desired selectivity in the tripping of downstream protection elements in the DC power supply system is therefore possible, wherein suitable dimensioning of the resistance can ensure that the permissible disconnection currents or energies of these protection elements are not exceeded.

The total current forming in the event of a short circuit in the DC power supply system is therefore limited to a defined overcurrent. Instead of an "uncontrolled short circuit", there is therefore a "controlled and defined overload".

In this case, the electrical resistance can comprise a single resistance or else a plurality of resistances.

In principle, given suitable dimensioning and parameterization, the protection device can be used not only for limiting short-circuit currents, but also for limiting other, in particular operationally dependent, overcurrents.

Particularly rapid switchover of a short-circuit current to the resistance and consequently particularly rapid limitation of the short-circuit current is possible by virtue of the fact that the first switch is in the form of a power semiconductor switch. This is also characterized by a function free of contact wear in comparison with a mechanical switch.

Preferably, the protection device also comprises a second switch for disconnecting the current limited by the resistance in the event of a short circuit. With the aid of this switch, the current guided via the resistance can be limited temporally and therefore the resistance and downstream protection elements can be protected against an overload.

The second switch can in this case be connected in series with the resistance. Downstream switches can then be disconnected in the currentless state and, as a result, can be configured as a contactor, for example.

Alternatively, the second switch can also be connected in series with the parallel circuit comprising the resistance and the first switch.

Preferably, the second switch is also in the form of a power semiconductor switch.

Particularly safe temporal limitation of the current guided via the resistance and therefore protection of the resistance and downstream protection elements against an overload is possible by virtue of the fact that the protection device comprises a monitoring and control device for monitoring the duration of a current through the second switch and for opening the second switch when the duration exceeds a predetermined limit value.

For use of the protection device between a battery and a load, said protection device advantageously comprises a diode, which is connected in parallel with the power semiconductor switch, the diode being polarized in such a way that its forward direction is opposite the forward direction of the power semiconductor switch. The discharge current of the battery can then flow via the power semiconductor switch and the charge current of the battery can then flow via the diode.

By virtue of a switch connected in series with the diode, a current flow in the forward direction through the diode can be prevented, and this current flow can be forced via the resistance instead. This can be used, for example, for current-limited energy exchange between individual batteries or battery strings after disconnection and subsequent reconnection thereof.

A switchgear assembly according to the invention for limiting and disconnecting short-circuit currents in high-energy DC power supply systems, in particular short-circuit currents of battery systems in submarine DC power supply systems, comprises a plurality of above-explained protection devices connected in parallel and at least one protection and/or switching element, which is connected downstream of these protection devices, the resistances of the protection devices being dimensioned in such a way that, in the event of a short circuit, a total current, which is formed by the sum of the currents flowing through the resistances and flows through the protection and/or switching element, trips the protection and/or switching element. As a result, selectivity in terms of tripping of various protection and/or switching elements is possible.

Preferably, the switchgear assembly serves to limit and disconnect short-circuit currents of high-power battery systems, in particular in submarine DC power supply systems, the high-power battery comprising a plurality of battery strings, connected in parallel, of high-power battery cells connected in series, the battery strings being connected individually or in groups to the DC power supply system via a respective connecting conductor, and each of the strings having the system voltage of the DC power supply system. In this case, the switchgear assembly has a respective protection device for each of the connecting conductors.

If the protection device in this case comprises a first switch in the form of a power semiconductor switch and a diode, which is connected in parallel with the power semiconductor switch, the diode being polarized in such a way that its forward direction is opposite the forward direction of the power semiconductor switch, it is preferable for the power semiconductor switch to be polarized in such a way that it allows the discharge current of the battery string or the group of battery strings to pass through, and the diode is polarized in such a way that it allows the charge current of the battery string or the group of battery strings to pass through.

In accordance with a particularly advantageous configuration, in this case the protection devices are each of the same type in standardized fashion. It is therefore possible to configure all of the battery strings or groups of battery strings connected in parallel and the protection devices connected thereto to be identical, with the result that the "controlled and defined overload" is distributed uniformly over all of the available (intact) battery strings in the event of a short circuit.

In a particularly advantageous manner, the design and/or parameterization of the protection devices is performed in such a way that fewer than the rated number of all of the battery strings in total can produce a sufficiently high overcurrent for tripping of downstream protection and/or switching elements. In the event of failure of any individual battery strings, there is then still sufficient total overcurrent available to ensure the required selectivity in the event of a short circuit in the power supply system.

By virtue of the limitation according to the invention of the short-circuit current to a defined overcurrent, in addition the energy released in the event of a disconnection operation in each battery string from inductances through which current is flowing becomes significantly lower than in the uninfluenced short circuit case; with the solution according to the invention, the energy released during the disconnection operation can, owing to the now limited overcurrent, be stored (for example charged to a capacitor) and/or "dissipated", i.e. converted into heat (for example in a varistor), in a relatively simple manner. This simplifies the dimensioning and/or physical size of the surge protectors generally required for semiconductor switches considerably.

Owing to the overcurrent limitation according to the invention provided for each battery string or each group of battery strings, the total overcurrent in the DC power supply system is also limited in terms of magnitude, with the result that downstream protection and/or switching devices, in particular electromagnetically actuated circuit breakers and miniature circuit breakers, are relieved of load to a significant extent during their own disconnection operation in the course of the selective clearance of short circuits.

The application of the invention preferably consists in DC power supply systems. In principle, however, it can also be used in AC power supply systems.

The invention and advantageous configurations of the invention will be explained in more detail below with reference to exemplary embodiments in the figures, in which:

DESCRIPTION OF THE INVENTION

Figure 1:
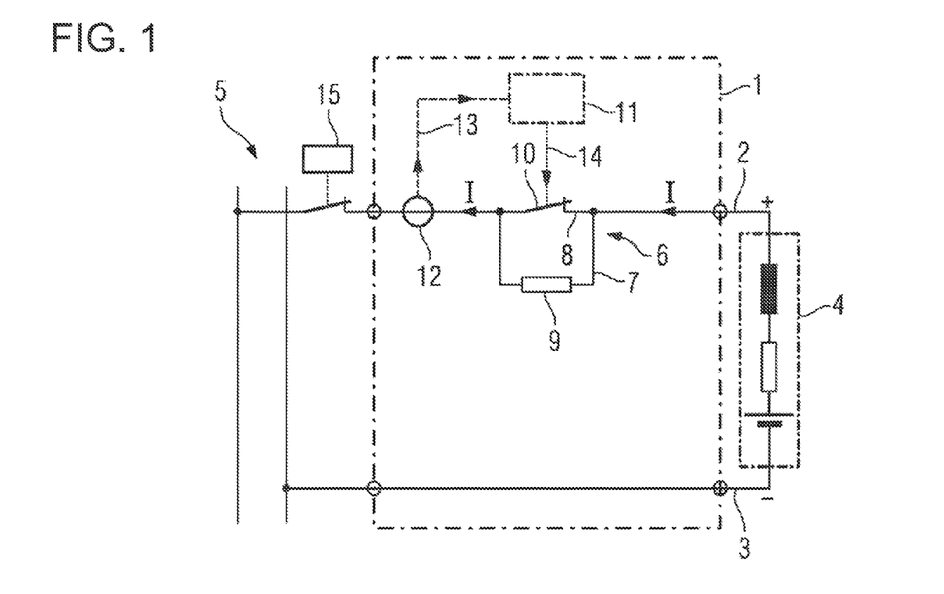
FIG. 1 shows a basic illustration of a first embodiment of a protection device according to the invention in the operating case without short circuits.

A short-circuit protection device 1 shown in a basic illustration in FIG. 1 is connected into connecting conductors 2, 3 of a battery 4 to a DC power supply system 5. The protection device 1 comprises a parallel circuit 6 comprising a first line path 7 and a second line path 8. The parallel circuit 6 is connected into the connecting conductor 2 with positive potential in all of the examples illustrated. In principle, the protection device 1 can also be connected into the connecting conductor 3 with negative potential or into both connecting conductors 2, 3.

An ohmic resistance 9 is arranged in the first line path 7. The resistance 9 serves to guide and limit a short-circuit current in the event of a short circuit.

A first switch 10, which is preferably in the form of a power semiconductor switch, is arranged in the second line path 8.

The switch 10 serves to bypass the resistance 9 when there is no short circuit in the power supply system.

A, preferably electronic, monitoring and control device 11 serves to monitor the current I through the switch 10 and to open the switch 10 when the current I through the switch 10 exceeds a limit value stored in the monitoring and control device 11. The monitoring and control device 11 is designed correspondingly for this purpose. Overcurrent identification takes place in this case by means of a current measuring element 12, which is connected in series with the parallel circuit 6. The monitoring and control device 11 is connected to the current measuring element 12 via a signal line 13 in order to detect the measured current values and is connected to the first switch 10 via a control line 14 in order to drive the first switch 10.

By means of a switch 15, which is connected in series with the parallel circuit 6 and is arranged in the connecting conductor 2 between the protection device 1 and the power supply system 5, i.e. is connected downstream of the protection device 1, a current limited by the resistance 9 can be disconnected in the event of a short circuit. The switch 15 is in this case preferably in the form of a circuit breaker.

In the operating state shown in FIG. 1, there is no short circuit in the power supply system 5. The switch 10 is therefore closed. As a result, the resistance 9 is bypassed and the current I flows exclusively via the first switch 10.

Figure 2:
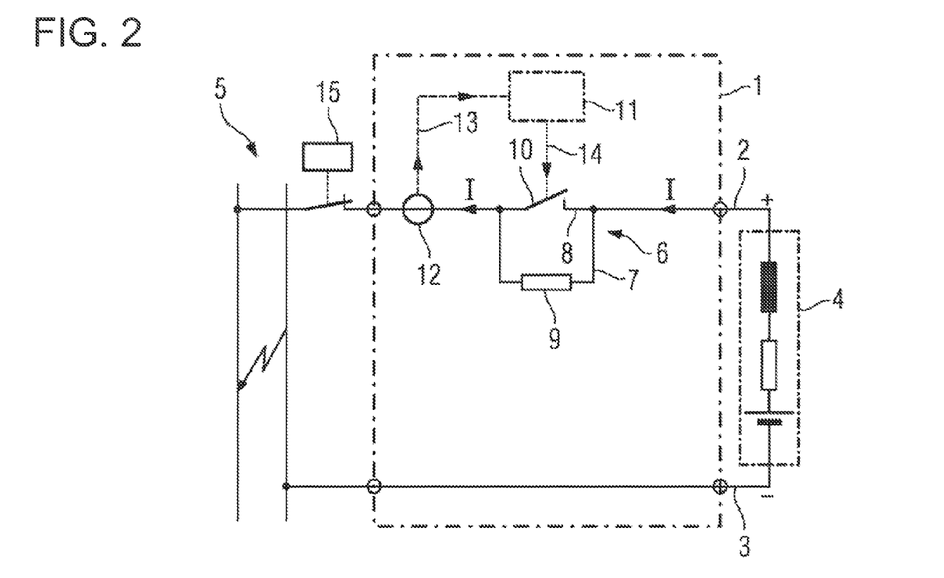
FIG. 2 shows the protection device shown in FIG. 1 in the event of a short circuit.

If the current I exceeds the predetermined limit value in the event of a short circuit in the power supply system 5, the monitoring and control device 11 opens the switch 10, with the result that the overcurrent is guided via the resistance 9 and is limited thereby (see FIG. 2). The short-circuit current limited to a defined value by means of the resistance 9 can then be disconnected by the switch 15.

Figure 3:
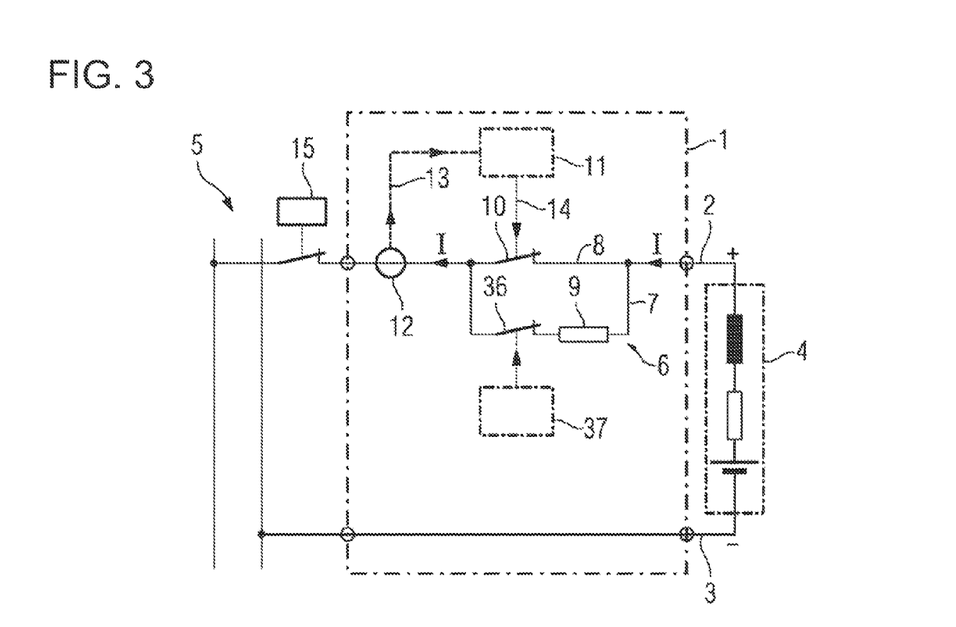
FIG. 3 shows a basic illustration of a second embodiment of a protection device according to the invention.

A protection device 1 shown in FIG. 3 differs from the protection device 1 shown in FIGS. 1 and 2 in that it has a second switch 36 in the form of a power semiconductor switch for disconnecting the overcurrent limited by the resistance 9. The switch 36 is in this case connected in series with the resistance 9 into the first line path 7. The downstream switch 15 can then be disconnected in the currentless state and thus be in the form of a contactor, for example. The driving of the switch 36 is performed via a, preferably electronic, monitoring and control device 37. Alternatively, the switch 36 can also be connected in series with the parallel circuit 6.

The monitoring and control device 37 serves to monitor the duration of a current through the switch 36 and to open the second switch 36 when the duration exceeds a predetermined limit value. The monitoring and control device 11 is designed correspondingly for this. The monitoring and control device 37 therefore determines how long the defined overcurrent flows through the resistance 9. If the short circuit in the power supply system 5 cannot be cleared within the predetermined time period, the monitoring and control device 37 opens the switch 36, as a result of which the current I is disconnected. Then, the battery 4 can be DC-isolated from the power supply system 5 by the switch 15 being opened.

If the short circuit in the power supply system can be cleared within the predetermined period of time, the switch 36 remains closed. If the battery current I then drops below the predetermined limit value again, the switch 10 is closed by the monitoring and control device 11 and the battery current I flows via the switch 10 again bypassing the resistance 9.

It is also possible to close the switch 10 again in the sense of automatic renewed making by means of the monitoring and control device 11 once a defined period of time has elapsed and prior to disconnection of the current limited by the resistance 9. If the current through the switch 10 then rises again, however, the switch 10 is disconnected again by the monitoring and control device 11 (possibly also finally), with the result that the current flows via the resistance 9 again. This operation can also be repeated a few times or the current can be disconnected finally via the switch 36. Then, in the currentless state, the battery 4 can be isolated from the power supply system 5 via the switch 15.

Figure 4:
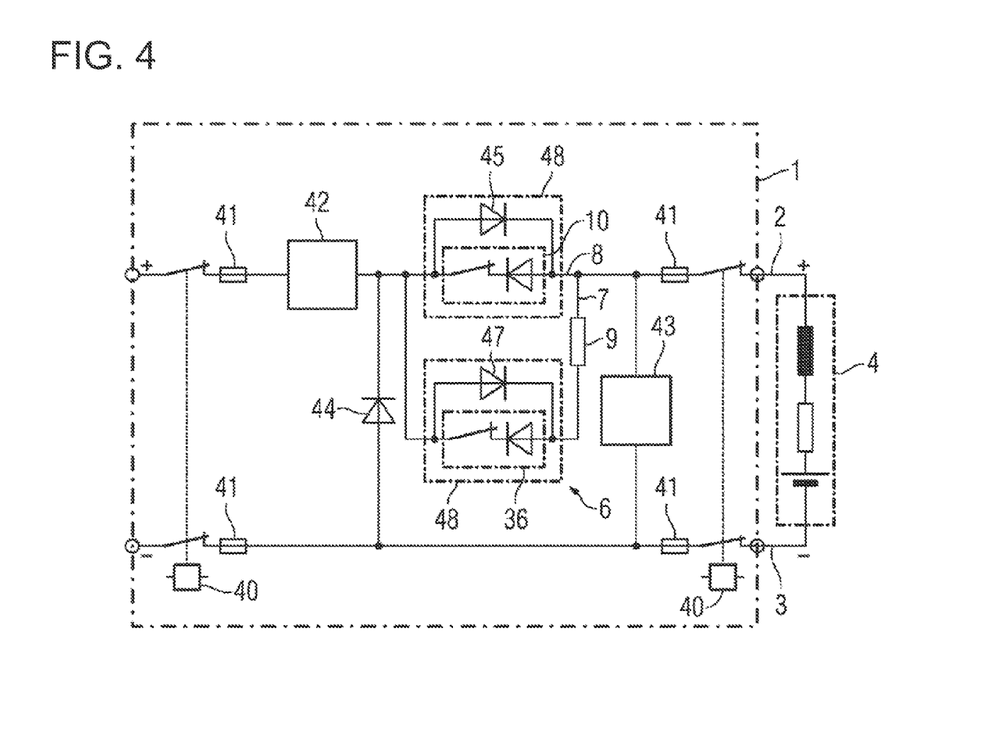
FIG. 4 shows a possible maximum configuration of a protection device.

FIG. 4 shows a possible maximum configuration of a protection device 1. The protection device 1 is in the form of a four-terminal network and is based on the configuration shown in FIG. 3. However, in addition to the components already explained in connection with FIGS. 1-3, it also comprises contactors (or possibly circuit breakers) 40 in order to make it possible for the protection device 1 to be isolated from the battery 4 and from the power supply system 5 on all sides and at all terminals as well as emergency fuses 41 for emergency protection on all sides and at all terminals. A current rise limiter 42 serves to limit the current rise in the direction towards the power supply system 5. On the battery side, the protection device 1 comprises a voltage limiter 43 (for example a varistor or a Zener diode) for the semiconductor switches 10, 36, said voltage limiter being connected in parallel with the battery 4 between the connecting conductors 2 and 3. For dynamic decoupling from the power supply system 5, a freewheeling diode 44 is connected in parallel with the power supply system 5. If the diode 44 is arranged on the system side upstream of the system-side contactor/circuit breaker 40, the contacts of said contactor/circuit breaker are relieved of load in the event of disconnection operations with respect to system-side currents.

The two semiconductor switches 10, 36 are in this case each in the form of a power semiconductor switch (illustrated symbolically by its equivalent circuit diagram in the form of a switching contact in series with a diode).

A diode 45 is connected in parallel with the semiconductor switch 10 in the form of a power semiconductor switch, the diode 45 being polarized in such a way that its forward direction is opposite the forward direction of the power semiconductor switch. The power semiconductor switch is polarized in such a way that it allows the discharge current of the battery 4 to pass through, and the diode 45 is polarized in such a way that it allows the charge current of the battery 4 to pass through. Correspondingly, a diode 47 is connected in parallel with the semiconductor switch 36 in the form of a power semiconductor switch.

Preferably, each of the semiconductor switches 10, 36 is in the form of an IGBT power semiconductor switch and is combined with the respected diode 45 or 47 connected in parallel therewith to form in each case a structural unit in the form of an IGBT module 48.

The protection device 1 furthermore comprises the control and monitoring devices 11 and 37 shown in FIGS. 1-3 with their associated components, which are not shown for reasons of simplified illustration, however.

In addition, yet further voltage limiters can be connected in parallel with the semiconductor switches 10, 36.

Figure 5:
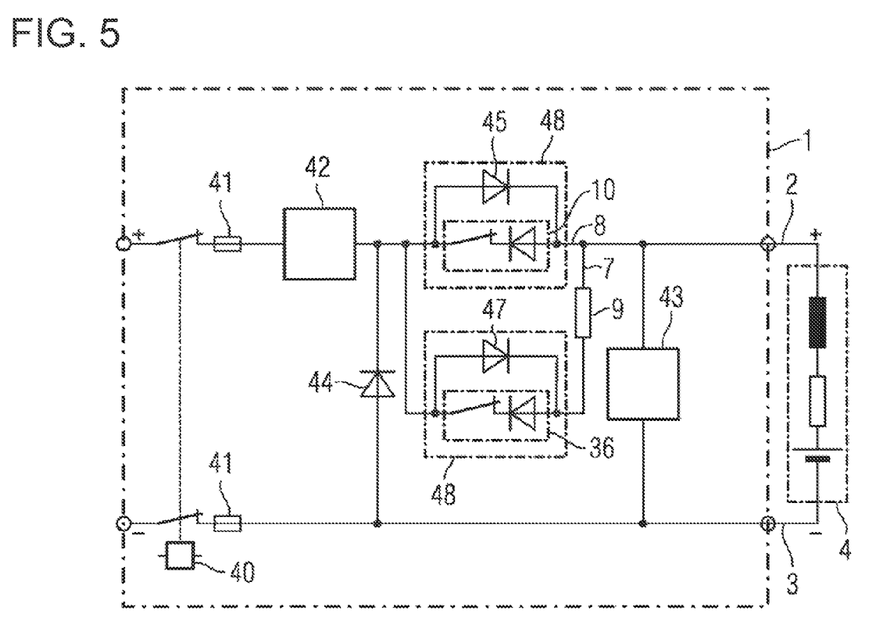
FIG. 5 shows a configuration of a protection device which is reduced in comparison with that in FIG. 4.

A reduced configuration shown in FIG. 5 differs from the configuration shown in FIG. 4 in that protection at all terminals by means of a contactor 40 and protection at all terminals by means of an emergency fuse 41 are only provided on the system side of the protection device 1.

Figure 6:
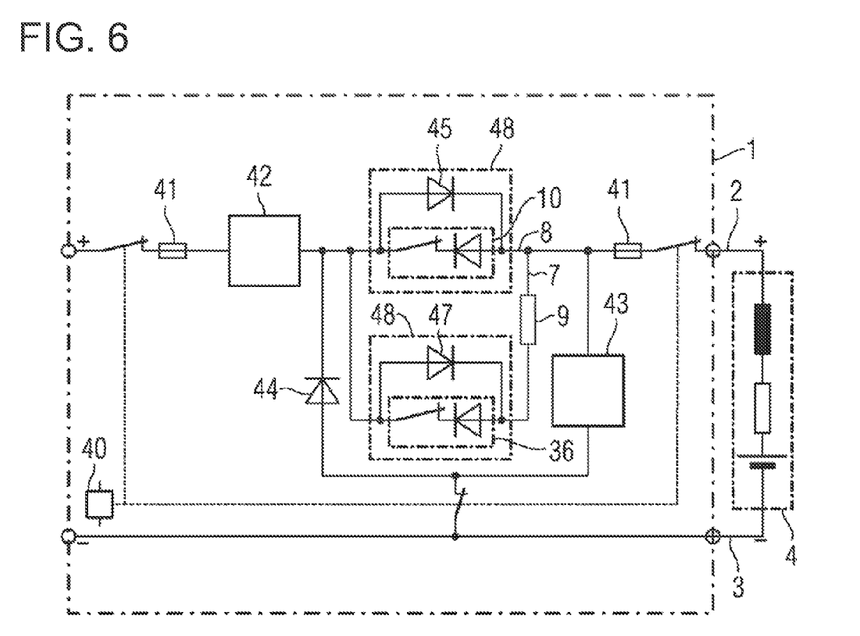
FIG. 6 shows a reduced configuration of a protection device as an alternative to that in FIG. 4.

An alternative, reduced configuration shown in FIG. 6 differs from the configuration shown in FIG. 4 substantially in that the protection device 1 is in the form of a reduced four-terminal (three-terminal) network. It is possible for the actual protection circuit to be isolated on all sides and at all terminals by a contactor (or possibly circuit breaker) 40. Protection by means of emergency fuses 41 is only provided for the connecting conductor 2 with the positive potential.

Figure 7:
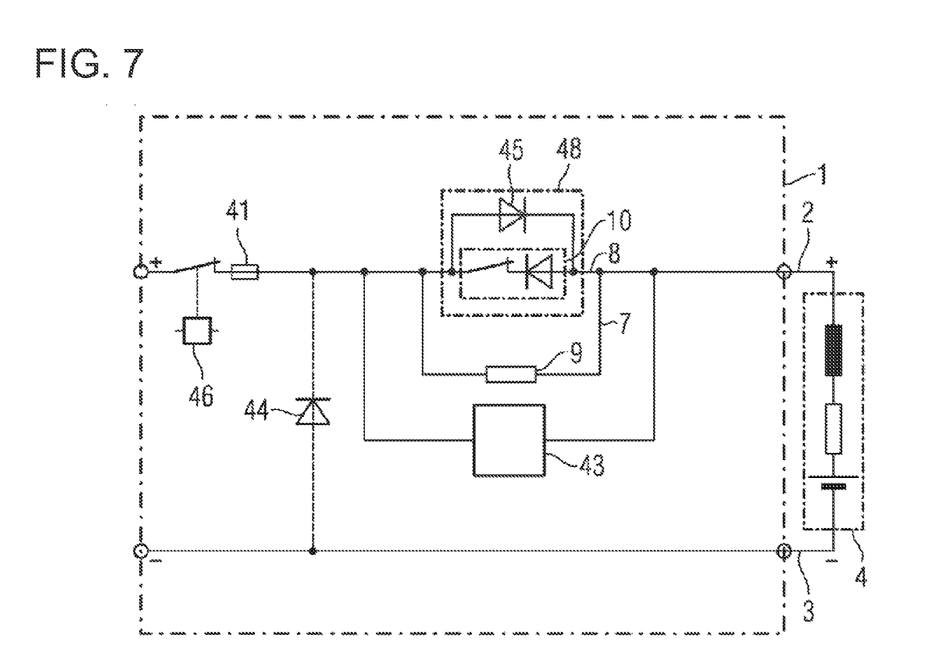
FIG. 7 shows a possible minimum configuration of a protection device.

A minimum configuration shown in FIG. 7 differs from the configuration shown in FIG. 4 substantially in that the protection device 1 is in principle only in the form of a two-terminal network. The switch 36 is omitted. Only the possibility of single-terminal isolation from the power supply system 5 is provided by a switch 46 arranged on the system side. In this case, the switch 46 needs to be in the form of a circuit breaker since it needs to shut down under load (with current limitation by virtue of the resistance 9). Protection by means of an emergency fuse 41 is only provided on the system side for the connecting conductor 2 with the positive potential. The voltage limiter 43 is preferably in the form of a varistor.

The protection devices 1 described by way of example above can have a modular design. The semiconductor components can be arranged on a common heat sink or else on separate heat sinks. The cooling can take place by means of air cooling, water cooling or forced cooling, for example, depending on the installation conditions and thermal power that needs to be dissipated. In event of an application in vehicles, a shock-resistant and/or vibration-proof embodiment is advantageous.

Figure 8:
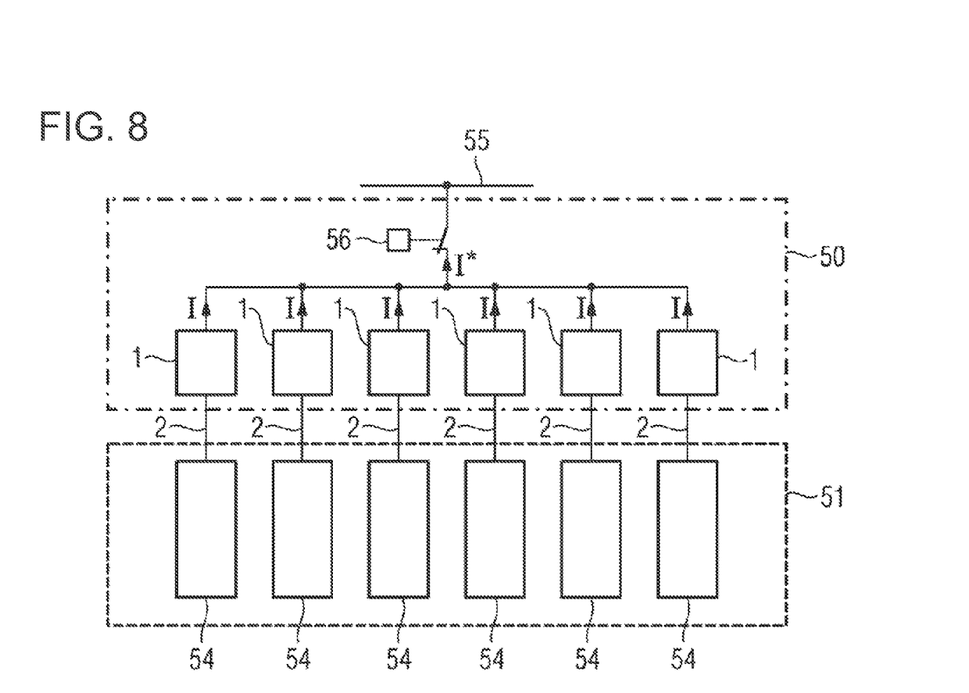
FIG. 8 shows a switchgear assembly according to the invention.

FIG. 8 shows a simplified illustration of a switchgear assembly 50 for limiting and disconnecting short-circuit currents of a high-power battery system 51 in a submarine DC power supply system 55. With respect to FIGS. 1-7, identical components are in this case noted by the same reference symbols. The high-power battery system 51 comprises a plurality of battery strings 54, which are connected in parallel and are connected to the DC power supply system 55 via a respective connecting conductor 2 with a positive potential. For simplification purposes, a single-terminal illustration has been selected, i.e. the connecting conductors with the negative potential are not shown. Each of the strings 54 has the system voltage of the DC power supply system 55 and comprises a string of high-power battery cells connected in series.

Instead of in each case individual strings 54, it is also possible for in each case groups of battery strings, which are connected in parallel and of which each has the system voltage of the DC power supply system 55, and therefore a plurality of battery strings, connected in parallel, to be connected jointly to the DC power supply system 55 via a respective connecting conductor 2. In each case one individual string 54 or a group of strings connected in parallel can in this case be combined in a respective battery module.

The switchgear assembly 50 has in each case one dedicated protection device 1 according to the invention for each of the connecting conductors 2 or each of the battery strings 54, as is described by way of example in FIGS. 1-7, said protection device being connected into the respective connecting conductor 2.

The monitoring and control devices 11, 37 of all the protection devices 1 (see FIGS. 1-3) can in this case also be combined centrally in a single superordinate monitoring and control device.

A protection element and/or switching element 56, for example a circuit breaker, can be connected downstream of the protection devices 1, which are connected in parallel. The resistances 9 (see FIGS. 1-7) of the protection devices 1 are in this case dimensioned such that, in the event of a short circuit, a total current I*, which flows through the protection element 56 and is formed by the sum of the currents I flowing through the resistances 9 of the protection devices 1, trips the protection and/or switching element 56.

If the switches 10 are in the form of power semiconductor switches, preferably in each case one diode 45 is connected in parallel with these switches 10 (see FIGS. 4-7). The power semiconductor switch is in this case polarized in such a way that it allows the discharge current of the respective battery string 54 to pass through, and the diode 45 is polarized in such a way that it allows the charge current of the respective battery string 54 to pass through.

Figure 9:
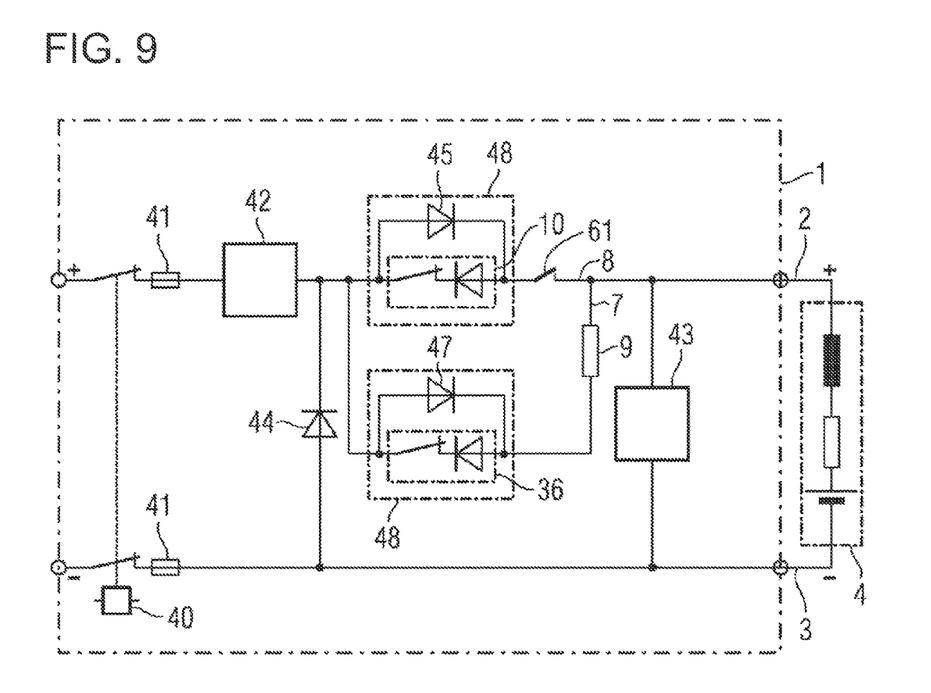
FIG. 9 shows a variant of the protection device illustrated in FIG. 5.

When battery strings 54 which have previously been disconnected and therefore possibly have a different potential are reconnected, a current-limited energy exchange between the battery strings 54 needs to be possible. In order that in the case of this energy exchange the current does not flow via the diode 45 of the virtually resistance-free line path 8 but via the resistive line path 7, a switch 61 (preferably an electromechanically actuable switch such as a circuit breaker or a contactor, for example) can be connected into the line path 8 in series with the diode 45, as is illustrated in FIG. 9 as an exemplary supplement to or extension of the protection device shown in FIG. 5, with it being possible for a current flow via said switch 61 to be prevented by the diode 45. This switch 61 is preferably arranged in the line path 8 upstream of the branch to the diode 45, when viewed from the battery 4 or the battery string 54. The supplement to or extension of the protection device according to the invention by the switch 61 as illustrated in FIG. 9 can be used in all embodiments of the protection device 1, as is illustrated by way of example in FIGS. 1 to 7, and can therefore also be used in the switchgear assembly 50 illustrated in FIG. 8.

All of the protection devices 1 of the switchgear assembly 50 are of the same type in each case. It is therefore possible to configure all of the battery strings 54 which are connected in parallel and the protection devices 1 connected thereto identically, with the result that the controlled and defined overload current is distributed uniformly over all available (intact) battery strings 54 in the event of a short circuit.

The design and/or parameterization of the protection devices 1 is in this case such that fewer than the rated number of all battery strings 54 in total produce a sufficiently high total overcurrent I* for tripping the protection and/or switching element 56. In the event of failure of any individual battery strings 54, there is then still sufficient total overcurernt I* available for ensuring the required selectivity in the event of a short circuit in the power supply system 55.

The invention claimed is:

1. A short circuit protection device for short circuit currents in high-energy DC power supply systems, the device comprising:
   an electrical resistance for guiding and limiting the short-circuit current in an event of a short circuit;
   a first switch connected in parallel with said electrical resistance and configured for bypassing said electrical resistance when no short circuit is in existence in the power supply system;
   a monitoring and control device connected to said first switch, said monitoring and control device monitoring a current flowing through said first switch and opening said first switch when the current through said first switch exceeds a predetermined threshold value;
   a second switch for disconnecting the current limited by said resistance in the event of a short circuit; and
   a further monitoring and control device connected to said second switch and configured for monitoring a duration of a current through said second switch and for opening said second switch when a duration of the current exceeds a predetermined limit value.

2. The protection device according to claim 1, wherein said electrical resistance is an ohmic resistor.

3. The protection device according to claim 1, wherein said first switch and said resistance are configured for limiting a short-circuit current in the high-energy DC power supply system.

4. The protection device according to claim 1, wherein said first switch and said electrical resistance are configured for disconnecting a short-circuit current in the high-energy DC power supply system.

5. The protection device according to claim 1, wherein the high-energy DC power supply system is a battery system in submarine DC power supply systems.

6. The protection device according to claim 1, wherein said first switch is a power semiconductor switch.

7. The protection device according to claim 1, wherein said second switch is connected in series with said resistance.

8. The protection device according to claim 1, wherein said second switch is connected in series with a parallel circuit comprising said resistance and said first switch.

9. The protection device according to claim 1, wherein said second switch is a power semiconductor switch.

10. The protection device according to claim 6, which further comprises a diode connected in parallel with said power semiconductor switch, said diode being polarized with a forward direction opposite a forward direction of said power semiconductor switch.

11. A short circuit protection device for short circuit currents in high-energy DC power supply systems, the device comprising:
   an electrical resistance for guiding and limiting the short-circuit current in an event of a short circuit;
   a power semiconductor switch connected in parallel with said electrical resistance and configured for bypassing said electrical resistance when no short circuit is in existence in the power supply system; and
   a monitoring and control device connected to said power semiconductor switch, said monitoring and control device monitoring a current flowing through said power semiconductor switch and opening said power semiconductor switch when the current through said power semiconductor switch exceeds a predetermined threshold value;
   a diode connected in parallel with said power semiconductor switch, said diode being polarized with a forward direction opposite a forward direction of said power semiconductor switch; and
   a further switch connected in series with said diode and configured for preventing a current through said diode in the forward direction thereof.

12. A switchgear assembly for limiting and disconnecting short-circuit currents in a high-power DC energy supply system, the assembly comprising:
   a plurality of protection devices each according to claim 1 connected in parallel with one another;
   at least one protection and/or switching element connected downstream of said protection devices;
   wherein individual said electrical resistances of said protection devices are dimensioned such that, in the event of a short circuit, a total current flowing through said protection and/or switching element and being formed by a sum of the currents flowing through said electrical resistances, triggers said protection and/or switching element.

13. The switchgear assembly according to claim 12, configured for short-circuit currents of a battery system in a submarine DC power supply system.

14. The switchgear assembly according to claim 12 for a high-power battery system, wherein the high-power battery system has a plurality of parallel-connected battery strings formed of high-power battery cells connected in series, the battery strings being connected individually or in groups via a respective connecting conductor to the DC power supply system, each of the strings having the system voltage of the DC power supply system, and wherein the switchgear assembly for each of the connecting conductors has a respective said protection device.

15. The switchgear assembly according to claim 14, wherein the high-power battery system is a submarine DC power supply system.

16. The switchgear assembly according to claim 14, wherein:
   said switch is a power semiconductor switch and a diode is connected in parallel with said power semiconductor switch, said diode being polarized with a forward direction opposite a forward direction of said power semiconductor switch; and
   said power semiconductor switch is polarized so as to allow a discharge current of the battery string or the group of battery strings to pass through, and said diode is polarized so as to allow a charge current for the battery string or the group of battery strings to pass through.

17. The switchgear assembly according to claim 14, wherein all of said protection devices are of a common type and formed in standardized fashion.

* * * * *